Patented Sept. 25, 1923.

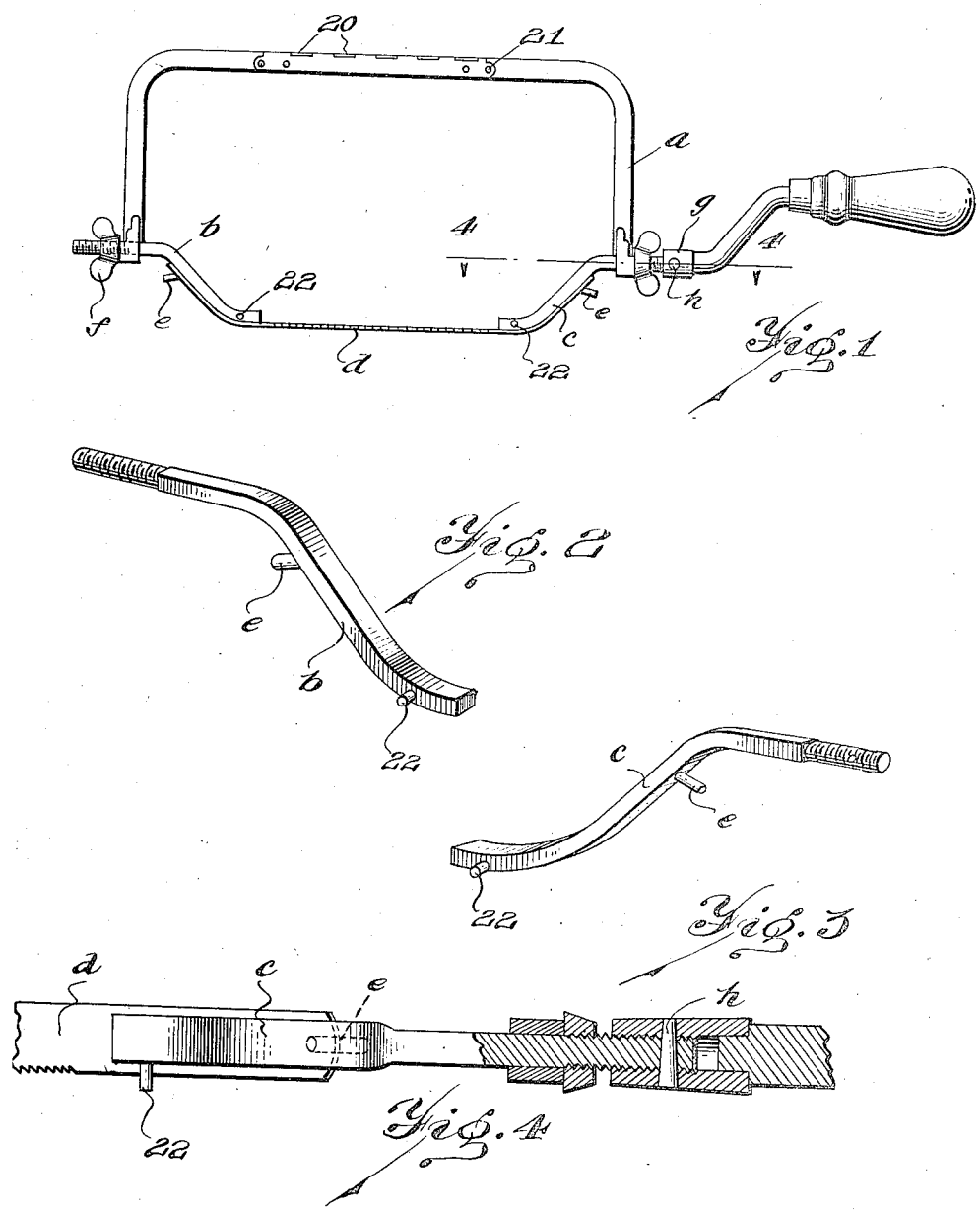

1,468,638

UNITED STATES PATENT OFFICE.

HARRY B. KIMMEL, OF HIGHLAND PARK, MICHIGAN.

SAW.

Application filed January 9, 1922. Serial No. 527,975.

*To all whom it may concern:*

Be it known that I, HARRY B. KIMMEL, a citizen of the United States, residing at Highland Park, in the county of Wayne and State of Michigan, have invented certain new and useful Improvements in Saws, of which the following is a specification.

This invention relates to hack or similar saws, and has for its object a hack saw arranged to work against a plane or a flat surface. For instance, in removing a bolt head from a boiler or a nut from a plane, flat surface, it is usually necessary to employ a cold chisel because the ordinary hack saw cannot work down to the flat surface on account of the handle and the frame being in the way. It is the object of the present invention to overcome this difficulty by providing a special form of blade-tensioning members. In my previous application No. 507,181, I have described and claimed a strut construction for bowing out the saw blade for this purpose. The present invention is cheaper to manufacture and does not require any special equipment on the yoke frame to achieve the bowing out of the blade.

In the drawings,—

Fig. 1 is a side elevation of the saw equipped with my improved blade-tensioning members.

Fig. 2 is a perspective of one of these.

Fig. 3 is a perspective of the other of these.

Fig. 4 is a detail of one of the slides that bears the handle.

*a* designates the yoke frame. This is arranged to take a pair of blade-tensioning members *b* and *c*. These blade-tensioning members are bowed or formed into elbows in which the two runs of the elbow are at an obtuse angle. Both of the blade-tensioning members *b* are in the form of slides provided with threaded portions on which are wing nuts. These elbow-like blade-tensioning members also have their inner ends curved in toward each other as shown in Fig. 1. This permits the flexible saw blade *d* to be hooked over the pegs *e* and then stretched over the outside faces of the elbow-like blade-tensioning members. When the wing nut *f* has been screwed down to pull the slide *b* out to the limits permitted by the flexible blade, it will be apparent that the blade is held in a bowed condition by being tensioned over the elbow-like blade-tensioning members.

Preferably the handle is also carried on an elbow or bowed spindle that angles away from the ends of the yoke frame, as is shown in Fig. 1. This elbow is provided with a threaded socket or ferrule *g* which may be turned onto the end of the blade-tensioning member *c* and the pin *h* then driven in. This holds the elbow and the handle from turning on the threads. With the handle thus remote from the end of the yoke arms, it will be obvious that this tool may be very easily used against flat surfaces while the handle will be completely removed from the surface by reason not only of the blade being carried upon the elbow-like or bowed blade-tensioning members but also by reason of the handle angling away from the blade due to the elbow-like handle spindle.

The back of the yoke is made in two pieces provided with slots and lugs 20 which interlock. When the back breaks on the pivot 21, the two parts may be slid along to lengthen the yoke and may then be engaged again. This permits the blade-tensioning members to be drawn away from each other. The pegs 22 can then be used to hold the ends of the saw blade and this will permit the hack saw to function in its normal way. If desired, the handle may be turned through one-half a turn to bring it down when it substantially aligns with the blade.

What I claim is:

1. A hack saw having in combination a handle, a yoke like frame connecting with the handle and longitudinally extensible and contractable, a pair of members having elbow portions secured to the ends of the yoke and adapted to bow out the intermediate portion of the blade beyond the ends of the yoke so that the handle and yoke ends will clear a surface contacted by the side of the blade, and means on the ends of said members for holding the blade in substantially the plane of the yoke when the frame has been adjusted to an extended position.

2. A hack saw, having in combination, a yoke-like frame, a pair of angularly bent bolts with tension nuts supported on the ends of the yoke frame and provided with saw tensioning pegs on angular portions at points removed from the ends of the bolts, a handle connecting with one of said bolts and a saw blade tensioned over the angular bolts and secured by said pegs, whereby the intermediate portion of the saw blade is bowed out beyond the ends of the yoke ends and the handle to permit the saw blade to contact a surface which is cleared by the handle.

3. A hack saw, comprising a yoke-like frame, a pair of angularly bent tensioning bolts and nuts supported by the ends of the yoke arms, a saw blade tensioned over said tensioning bolts and bowed out beyond the ends of the yoke frame, and a handle having an angularly bent spindle and connected with one of the tension bolts whereby the blade may contact with a surface and whereby the handle is removed from such surface and thereby keeps the hand grasping the handle clear of said surface.

In testimony whereof I affix my signature.

HARRY B. KIMMEL.